(12) United States Patent
Lykkegaard

(10) Patent No.: US 10,464,759 B2
(45) Date of Patent: Nov. 5, 2019

(54) SORTER WITH REDUCED POLYGON EFFECT

(71) Applicant: BEUMER Group A/S, Aarhus N (DK)

(72) Inventor: Uffe Lykkegaard, Aarhus C (DK)

(73) Assignee: Beumer Group A/S, Aarhus N (DK)

( * ) Notice: Subject to any disclaimer, the term of this patent is extended or adjusted under 35 U.S.C. 154(b) by 0 days.

(21) Appl. No.: 15/778,648

(22) PCT Filed: Nov. 29, 2016

(86) PCT No.: PCT/DK2016/050400
§ 371 (c)(1),
(2) Date: May 24, 2018

(87) PCT Pub. No.: WO2017/092763
PCT Pub. Date: Jun. 8, 2017

(65) Prior Publication Data
US 2018/0354730 A1    Dec. 13, 2018

(30) Foreign Application Priority Data
Nov. 30, 2015 (DK) .................................. 2015 70777

(51) Int. Cl.
*B65G 17/22*     (2006.01)
*B65G 21/22*     (2006.01)
(Continued)

(52) U.S. Cl.
CPC .............. *B65G 47/96* (2013.01); *B65G 17/22* (2013.01); *B65G 21/22* (2013.01); *B65G 47/965* (2013.01);
(Continued)

(58) Field of Classification Search
CPC ........ B65G 17/22; B65G 21/22; B65G 47/96; B65G 54/02; B65G 47/965
(Continued)

(56) References Cited

U.S. PATENT DOCUMENTS 1,872,903 A    8/1932    Cutter
2,743,003 A    4/1956    Allen
(Continued)

FOREIGN PATENT DOCUMENTS

CN    1822983 A    8/2006
CN    101100262 A    1/2008
(Continued)

OTHER PUBLICATIONS

Machine translation of DE102009051043A1 by Lexis Nexis Total Patent on May 23, 2018.
(Continued)

*Primary Examiner* — Douglas A Hess
(74) *Attorney, Agent, or Firm* — Woodard, Emhardt, Henry, Reeves & Wagner, LLP

(57) ABSTRACT

In order, e.g., to provide a line sorter in which acoustic noise resulting from the polygon effect is reduced, there is disclosed a sorter (102) for sorting items of various shapes, sizes and weights, such as postal parcels or airport baggage. The sorter includes a closed loop comprising a plurality of sorting carts (302) for moving along an upper track section, a lower track section and end track sections in a moving direction. The plurality of carts are coupled at couplings (312), which enable the carts to pivot relatively to each other in at least one plane when in operation. Each cart is able to pivot relatively to an adjacent cart at two or more pivot points (404, 414, 1002) where the two or more pivot points are positioned a pivot point distance greater than zero apart in the moving direction of the carts.

16 Claims, 10 Drawing Sheets

(51) Int. Cl.
    *B65G 47/96* (2006.01)
    *B65G 54/02* (2006.01)
    *B07C 1/02* (2006.01)
    *B07C 5/38* (2006.01)

(52) U.S. Cl.
    CPC .............. *B65G 54/02* (2013.01); *B07C 1/02* (2013.01); *B07C 5/38* (2013.01); *B65G 2201/0264* (2013.01); *B65G 2201/0285* (2013.01)

(58) Field of Classification Search
    USPC .......... 198/370.01, 370.03, 370.06, 619, 890
    See application file for complete search history.

(56) References Cited

U.S. PATENT DOCUMENTS

| | | | |
|---|---|---|---|
| 2,954,113 | A | 9/1960 | Hibbard |
| 5,489,020 | A | 2/1996 | Clopton |
| 5,492,215 | A | 2/1996 | Affeldt |
| 6,009,992 | A * | 1/2000 | Erceg .................... B65G 47/962 198/370.04 |
| 6,253,910 | B1 * | 7/2001 | Axmann .............. B65G 17/345 198/370.06 |
| 6,273,268 | B1 | 8/2001 | Axmann |
| 6,298,975 | B1 * | 10/2001 | Fortenbery ............ B65G 47/38 104/284 |
| 6,425,478 | B1 | 7/2002 | Eberle |
| 6,478,138 | B1 * | 11/2002 | Edwards .............. B65G 17/345 198/370.06 |
| 6,715,599 | B1 | 4/2004 | Fortenbery |
| 6,736,254 | B1 * | 5/2004 | Fortenbery .......... B65G 47/962 198/370.03 |
| 7,080,725 | B2 * | 7/2006 | Hishinuma .......... B65G 17/345 198/370.06 |
| 7,168,556 | B2 | 1/2007 | Spoeler |
| 7,588,140 | B2 * | 9/2009 | van den Goor ...... B65G 17/066 198/831 |
| 8,770,379 | B2 * | 7/2014 | Van Den Goor .... B65G 17/066 198/370.02 |
| 9,233,803 | B2 * | 1/2016 | Pilarz .................... B65G 47/53 |
| 9,676,566 | B2 * | 6/2017 | Porat .................... B65G 47/962 |
| 9,902,569 | B2 * | 2/2018 | Lykkegaard ......... B65G 47/962 |
| 10,160,606 | B2 * | 12/2018 | Erceg .................... B65G 47/96 |
| 2006/0157320 | A1 | 7/2006 | Spoeler |
| 2008/0017475 | A1 | 1/2008 | Illedits |
| 2010/0022358 | A1 | 1/2010 | Schwaiger |
| 2011/0127140 | A1 | 6/2011 | Brunsen |

FOREIGN PATENT DOCUMENTS

| | | |
|---|---|---|
| CN | 101544335 A | 9/2009 |
| CN | 203079274 U | 7/2013 |
| DE | 4240989 A1 | 6/1994 |
| DE | 19707311 A1 | 8/1998 |
| DE | 102009051043 A1 | 5/2011 |
| DE | 102012000665 | 8/2012 |
| EP | 0221866 B1 | 8/1990 |
| EP | 0739831 A2 | 10/1996 |
| EP | 0930248 A2 | 7/1999 |
| EP | 1644239 B1 | 8/2007 |
| EP | 2185449 B1 | 9/2011 |
| GB | 990782 | 5/1965 |
| GB | 1411071 | 10/1975 |
| JP | S59102716 A | 6/1984 |
| JP | 09183518 A | 7/1997 |
| JP | H1067426 A | 3/1998 |
| JP | 10114410 A | 5/1998 |
| JP | 2013103801 A | 5/2013 |
| WO | WO 98/47797 | 10/1998 |
| WO | WO 00/32502 | 6/2000 |
| WO | 2015/174843 A1 | 11/2015 |

OTHER PUBLICATIONS

Machine translation of DE19707311A1 by Lexis Nexis Total Patent on May 23, 2018.
Machine translation of DE4240989A1 by Lexis Nexis Total Patent on May 23, 2018,.
Machine translation of JP09183518A by Lexis Nexis Total Patent on May 23, 2018.
Machine translation of JP10114410A by Lexis Nexis Total Patent on May 23, 2018.
Written Opinion and International Search Report issued in related PCT/DK2016/050400 dated Feb. 23, 2017.
Machine translation of CN101544335A by Patent Translate European Patent Office dated Aug. 22, 2019 (p. 13).
Machine translation of CN203079274U by Patent Translate European Patent Office dated Aug. 22, 2019 (p. 15).
Machine translation of DE102012000665A1 by Patent Translate European Patent Office dated Aug. 22, 2019 (p. 24).
Machine translation of JP2013103801A by Patent Translate European Patent Office dated Aug. 22, 2019 (p. 37).
Machine translation of JPH1067426A by Patent Translate European Patent Office dated Aug. 22, 2019 (p. 19).
Machine translation of JPS59102716A by Patent Translate European Patent Office dated Aug. 22, 2019 (p. 11).
Office Action issued in related Chinese Application No. 201680080496.5 dated Jul. 2, 2019.

* cited by examiner

SORTER WITH REDUCED POLYGON EFFECT

FIELD OF THE INVENTION

The invention relates to a sorter, in particular a line sorter, for sorting items of various shapes, sizes and weights, in particular postal parcels or airport baggage. The invention is particularly related to reducing the polygon effect resulting from the sorting carts moving through end track sections of the sorter.

BACKGROUND OF THE INVENTION

A sorter is a device able to sort items according to their identification and by loading or inducting the items onto the sorter and unloading, i.e. discharging them, at a discharge in accordance with the identification and thus into one or more discharges dedicated to the items.

Sorters of the type as the present invention are typically suited for sorting several thousands of items per hour. Thus, e.g. a substantial amount of energy may be used by the system and some acoustic noise may also be generated. Furthermore, due to a need for high performance, e.g. in terms of number of sorted items per hour, but also including a need for extreme reliability, each part of the system must be engineered to suit these needs, while limiting the amount of energy used and the acoustic noise generated when operating the system.

Some line sorter systems may have had a high reliability, but may then have been in need of a high amount of energy to operate. Other systems may have needed a low amount of energy to operate, but then suffered from a high amount of generated acoustic noise and/or suffered from having a low capacity measured in its ability to sort a given number of items per hour. Some systems suffer from a too high initial cost and/or a too high cost of maintaining the systems and/or do not provide numerous years of hassle-free operation.

Thus, in order to solve such or other issues, it has been appreciated that an improved line sorter is of benefit, and in consequence, the present invention has been devised.

SUMMARY OF THE INVENTION

It may be seen as an object of the present invention to provide an improved sorter. Preferably, the invention alleviates, mitigates or eliminates one or more of the above or other disadvantages singly or in any combination.

Alternatively or additionally, it may be seen as an object of the invention to provide a line sorter which has a reduced acoustic noise level and/or energy consumption when compared to known systems. In particular, it may be seen as an object of the present invention in which acoustic noise resulting from the polygon effect is reduced.

Accordingly there is provided a sorter for sorting items of various shapes, sizes and weights, such as postal parcels or airport baggage, the sorter comprising an upper track section and a lower track section, where the upper track section and the lower track section are connected at end track sections, one end track section at each of two ends of the sorter,
at least one position dedicated induction of items onto the sorter, such as by an induction,
a plurality of discharges for sorting one or more items into their respective discharge,
a closed loop comprising a plurality of sorting carts being provided for moving along the upper track section, the lower track section and the end track sections in a moving direction,
the plurality of sorting carts each comprising at least one item supporting surface,
where the plurality of carts are coupled at couplings, which couplings enable the carts to pivot relatively to each other in at least one plane when in operation,
where each cart is able to pivot relatively to an adjacent cart at two or more pivot points, where the two or more pivot points are positioned a pivot point distance greater than zero apart in the moving direction of the carts.

Thus, an improved sorter is provided. It may be seen that when the sorter is provided as disclosed herein, a reduced level of acoustic noise is generated by the sorter.

Due to a variance in diameter from a centre of the end section of the track and to a given point of the carts moving in the end section, a velocity of the coupled carts varies in a cyclic manner. Hereby, a varying acceleration will be present in the coupled carts, resulting in varying tension in the closed loop of the carts in the sorter track. This can be referred to as the polygon effect. As examples, this results in unwanted wear, vibrations and thus also acoustic noise and/or increased use of energy. It is an insight disclosed herein that a construction as described herein reduces such acoustic noise etc. caused by the polygon effect. It may be seen, that by including pivot points for the described system in the described manner, the polygon effect is reduced. In particular, the polygon effect is reduced in a manner that does not affect sorting capacity of the sorting system.

Preferably, at least one of the pivots is offset from an end of a cart in the moving direction of the cart in the track. Preferably, at least one of the pivot points is provided along the length of the cart in the moving direction of the cart, below the cart.

The plurality of coupled carts in the sorter track preferably has a fixed length in the moving direction of the carts or substantially fixed length in the moving direction of the carts when coupled. Preferably, the length of the closed loop of coupled carts only has a slight change of length due to temperature changes and/or minor wear and tear.

In embodiments of the invention, a first cart of the plurality of carts, which is adjacent to a second cart of the plurality of carts when in operation, comprises a first pivot point and the second cart comprises a second pivot point. As a possible addition to this principle, a further pivot point can be provided, e.g. by a link in the coupling comprising a pivot point.

A link is included to couple the first cart and the second cart, and the link can be provided between the first pivot point and the second pivot point. The link overlaps at least in part a length of a horizontal projection of at least one of the item supporting surfaces of the first and second carts in the moving direction of the carts. The pivot point distance is shorter than a length of at least one of the item supporting surfaces in the moving direction of the carts.

In embodiments of the invention, each of the plurality of carts comprises one or more carrying wheels or similar rolling means for carrying the cart and the item supporting surface. Further, the one or more carrying wheels are provided at the pivot points, at least one carrying wheel or one set of carrying wheels at each pivot point. Hereby, a sturdy construction where the carts in an optimised manner follow the track is provided. Further, and particularly when including two carrying wheels (or sets) per cart that are offset in the moving direction, the carrying wheels will keep the item supporting surface of the cart horizontal or substantially horizontal, when the carts are in operation and moving along the upper or lower sections. The rolling means, such as carrying wheels, cooperate with the track sections so as to control the position of the carts relative to the track and/or to carry the carts along the upper, lower and end track sections. The wheels or rolling means keeps the carts substantially horizontally when in operation and when the carts are provided at, or moving in, the upper and/or lower track sections.

In embodiments of the invention, a pivot axis A is comprised at the first pivot point and a pivot axis A' is comprised at the second pivot point, and a carrying wheel at the first pivot point turns about a rolling axis R and a carrying wheel at the second pivot point turns about a rolling axis R'. In preferred embodiments, the pivot axis A is coaxial with rolling axis R and/or pivot axis A' is coaxial with rolling axis R'. Hereby, it may be seen that the construction can be simplified.

In embodiments of the invention, the sorter further comprises horizontally guiding means, rolling means or sliding means for horizontally guiding the carts along the track when in operation. In preferred embodiments, the horizontally guiding means are horizontally guiding wheels that rotate about an axis C, which is vertical or substantially vertical along the upper track section and the lower track section when the sorter is in operation. Further, the horizontally guiding wheels are positioned and oriented so that a line coaxial with the axis C intersects a centre of radius of at least a segment of an end track section, when the sorter is in operation and a cart with the axis C is moved along one of the end track sections. Hereby, an example of an advantage is that reduced wear and/or acoustic noise is produced by the sorter.

In embodiments of the invention, the plurality of sorting carts are moved along the upper track section, the lower track section and the end track sections in the moving direction when in operation by a linear synchronous motor propulsion system. Further, a first continuous row of permanent magnets is formed by the magnets of a row of carts along the upper track section and a second continuous row of permanent magnets is formed by the magnets of a row of carts along the lower track section. The plurality of permanent magnets on the carts follow or substantially follow a curve form at the end track sections and a gap between adjacent magnets in the first and second continuous rows of magnets is the same or substantially the same between each of the magnets. Still further, the gap is also the same or substantially the same between adjacent magnets of adjacent carts. In particular embodiments each of the plurality of carts comprises a plurality of permanent magnets positioned below the complete length of a projection of the item supporting surface in the moving direction of the carts or positioned substantially along the complete length of the projection of the item supporting surface.

Using a propulsion system as described is found of particular interest with the construction as described herein. In particular, a reduced polygon effect is provided while the system is still useable with the propulsion system as described.

According to embodiments of the invention, the at least one position dedicated induction of items onto the line sorter, is at the lower track section and/or at the upper track section. Induction may be carried out manually, by one or more operators placing items on the sorter at such position (s) dedicated induction. Alternatively or additionally, items may be placed on the sorter utilising one or more robots. Alternatively or additionally, items may be placed on the sorter utilising an induction comprising a number of conveyor belts leading the items to the sorter.

Independent of the manner of inducting items, the at least one position dedicated induction of items onto the line sorter may alternatively or additionallt be provided at an end track section, such as e.g. for placing the items on an item transport surfaces just after the surfaces has entered the upper track section.

According to embodiments of the invention, the plurality of discharges are provided along the lower track section and/or the upper track section. It may be seen as preferred to position the discharges at the upper track section.

By referring to an advantage herein, it must be understood that this advantage may be seen as a possible advantage provided by the invention, but it may also be understood that the invention is particularly, but not exclusively, advantageous for obtaining the described advantage. In general, the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
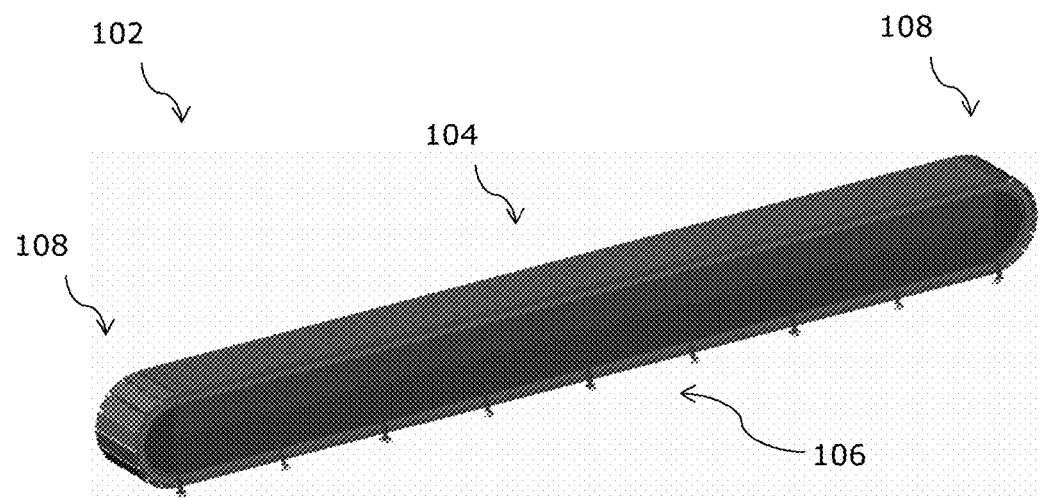
FIG. 1 shows a line sorter in a perspective view.

FIG. 1 shows a line sorter 102 in a perspective view. The figure does not show any inductions or discharges or other peripherals or parts of the system, such as a control system. The line sorter 102 is adapted for sorting items of various shapes, sizes and weights, such as postal parcels or airport baggage.

The line sorter includes an upper track section 104 and a lower track section 106. The upper section and the lower section are operably connected to, or otherwise operably positioned at, end track sections 108. There is one end track section at each of the two ends of the line sorter. At least one position at the lower track section and/or the upper track section is dedicated induction of items onto the line sorter 102, such as by an induction or conveyor (not shown).

Although also not shown, a plurality of discharges or chutes is normally provided along the lower track section and/or the upper track section, and for sorting one or more items into their respective discharge, i.e. the chutes are provided to receive the items which are discharged from the sorter. Due to the construction of the shown embodiment, such induction(s) and discharge(s) would be positioned for use at the upper track section only or at an end track section.

In the embodiments herein, the end track sections are shown as substantially circular and with a substantially constant radius and thus a constant curvature. However, at least sections of the end track sections may be provided with a non-circular form, such as an Euler spiral segment or a Bezier spiral segment.

In particular and as an example, the first and last segments of the end track sections leading to the straight upper and lower section may be provided with a clothoid curve form. Hereby a centrifugal force from the carts can be smoothly, and more smoothly than with a circular shape, changed from zero along the straight section and gradually increased along the clothoid segment. Then, possibly, a mid segment is circular followed by a clothoid segment for a more smooth transition to the straight section or segment again. It is preferred that this is provided in such a way that the coupled carts go from the upper straight track section, into a first, preferably clothoidal segment, and from here goes with constant curvature into the circular segment. Further a form of the end track section is preferably going from the circular segment with a constant curvature into the second, again, e.g. clothoidal segment, and from here goes with constant curvature into the lower track section.

Figure 2:
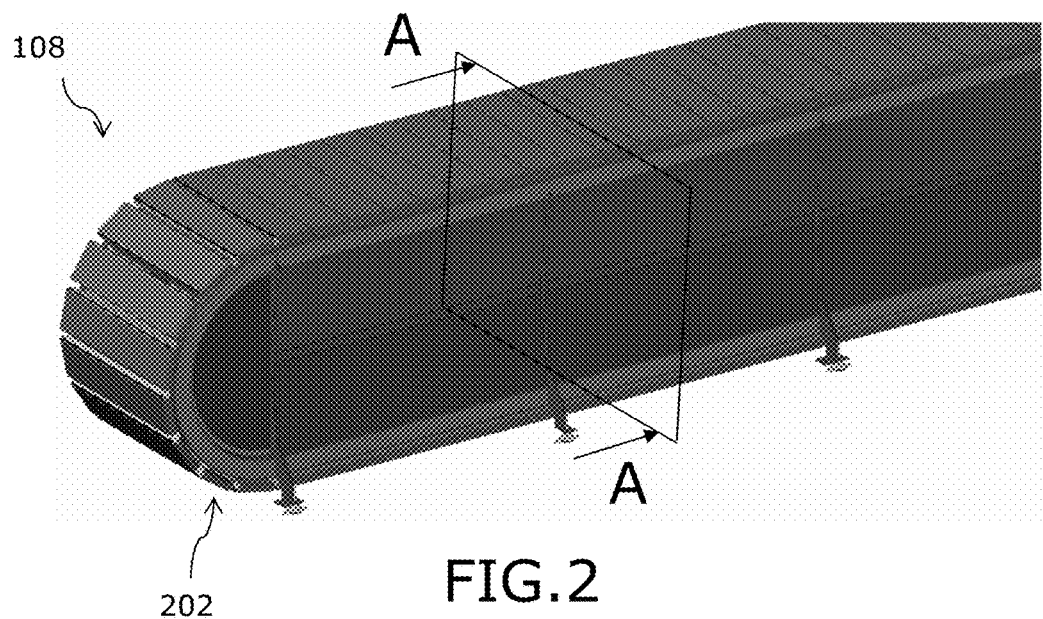
FIG. 2 is a close up of one track end of the line sorter.

FIG. 2 is a close up of one track end 108 of the line sorter 102 shown in FIG. 1, and shows a curve form 202 of the end track section. A cross-sectional view direction A-A is indicated through the line sorter and illustrated in FIG. 3. It follows that the sorter is provided in an over/under configuration, i.e. where the upper track section is provided in line with, but directly above the lower track section, i.e. in a closed loop.

Figure 3:
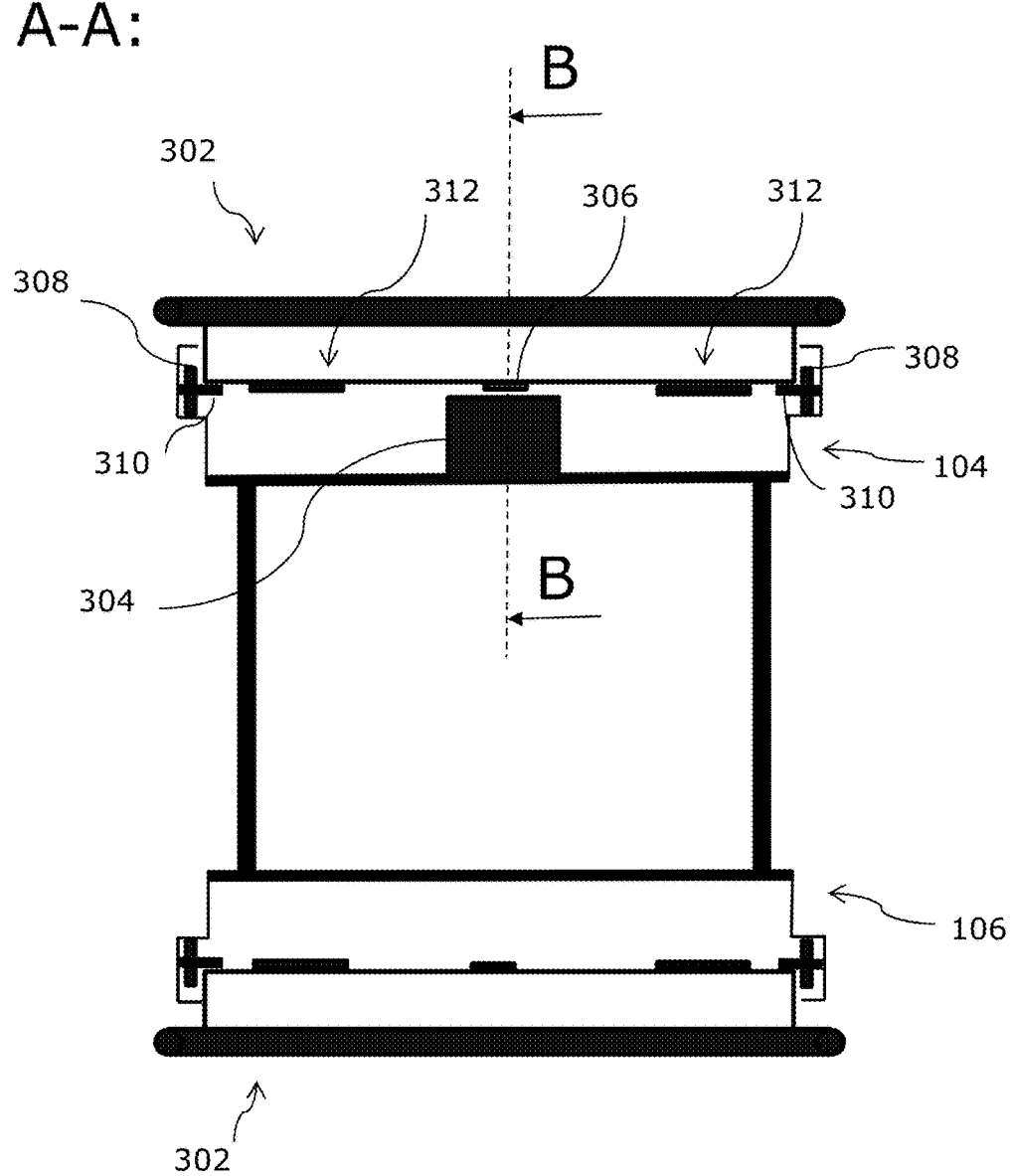
FIG. 3 is the cross-sectional view of the line sorter as indicated in FIG. 2.

FIG. 3 is the cross-sectional view of the line sorter as indicated in FIG. 2, i.e. parallel with a moving direction of the carts along the upper track section. The figure illustrates that the line sorter 102 comprises sorting carts 302 coupled at couplings 312. The carts 302, alternatively referred to as slats, are provided for moving along the upper track section, the lower track section and the end track sections. The couplings 312 enable the carts to pivot relatively to each other about a horizontal or substantially horizontal pivot axis when in operation.

Figure 4:
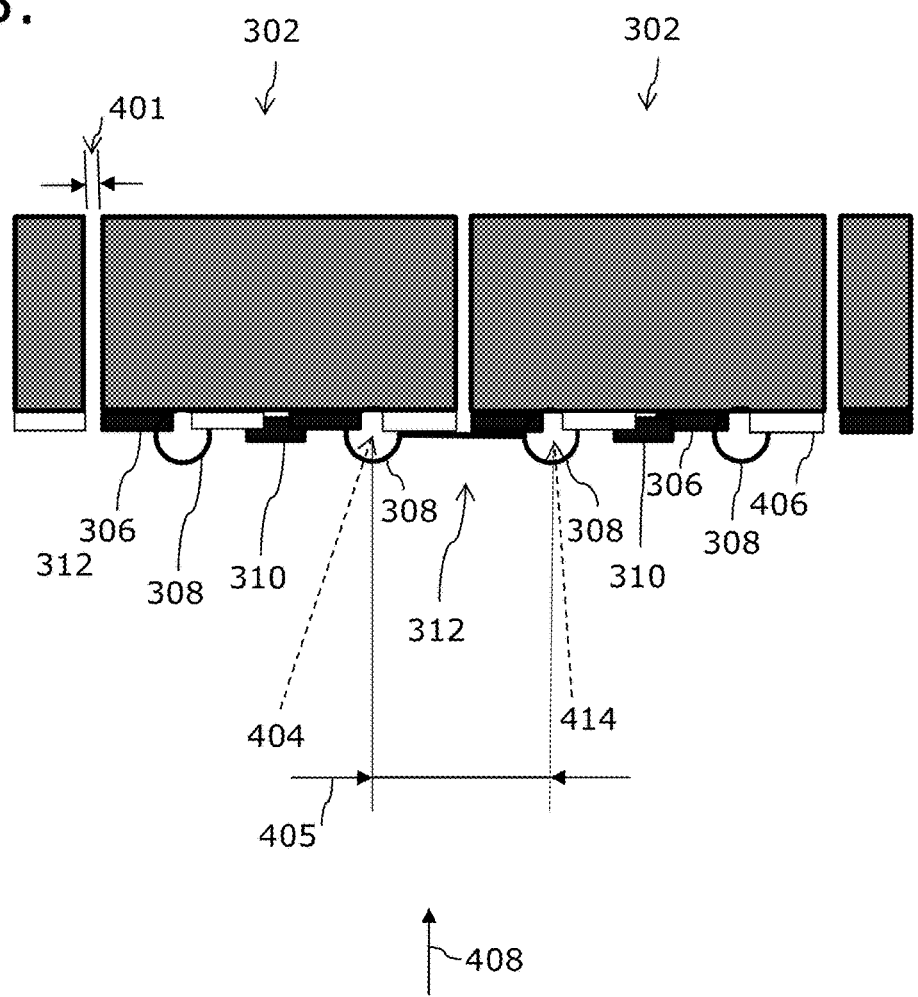
FIG. 4 is a cross-sectional view of a number of carts of the line sorter along the line B-B and in the direction as indicated in FIG. 3.

There is also illustrated a linear synchronous motor propulsion system 304, 306 for moving the coupled carts. The magnets 406 shown in FIG. 4 are also included in the linear synchronous motor propulsion system. The linear synchronous motor propulsion system includes a stationary travelling field stator 304 cooperating with a plurality of permanent magnets 306, 406 positioned on the coupled carts.

Carrying wheels 308 are shown towards each side of the cart 302. These wheels are provided for enabling movement of the carts along the closed track including the track sections 104, 106, 108 and for controlling position of the carts, mainly in the vertical direction. Likewise, guiding wheels 310 are illustrated and provided for controlling position of the carts in the horizontal direction.

FIG. 4 is a cross-sectional view of a number of carts of the line sorter 102 along the line B-B and in the direction as indicated in FIG. 3. Two carts 302 and the end or start of two further carts is shown. The carts are coupled to adjacent carts by couplings 312. The couplings 312 cannot be seen in detail, however they are also shown, e.g. in FIG. 8 or 9.

The coupling 312 enables the carts 302 to pivot relatively to each other around the two pivot points 404 and 414, in particular, or moreover, when the carts follow or substantially follow the curve form of the end track sections. It can be seen that the pivot point distance 405 is about half the length of a cart. It can also be seen that the pivot points are positioned with the same or substantially the same distance away from each end of the carts. In the illustrated embodiment, the distance is about 25% of the length of the cart. Hereby one may adjust the forces from the carts on the track, resulting from the distance that the pivot points are positioned from ends of the carts.

In a construction with a single pivot point coupling the ends of the adjacent carts, a cart can only pivot relatively to the adjacent cart at the single pivot point. Further, and due to the position of said single pivot point and the coupling with the single pivot point between the carts, the ends of the carts can only pivot relatively to each other at the single pivot point. This is however contrary to the system embodied herein.

Each of the plurality of carts is able to pivot in the at least one plane around the two pivot axes relatively to an adjacent cart. When at least one of the pivot points is positioned a distance from an end of a cart, then the part of the cart from the pivot point and until the end of the cart does not form part of a side in the polygon, and thus the polygon effect is reduced.

Figure 12:
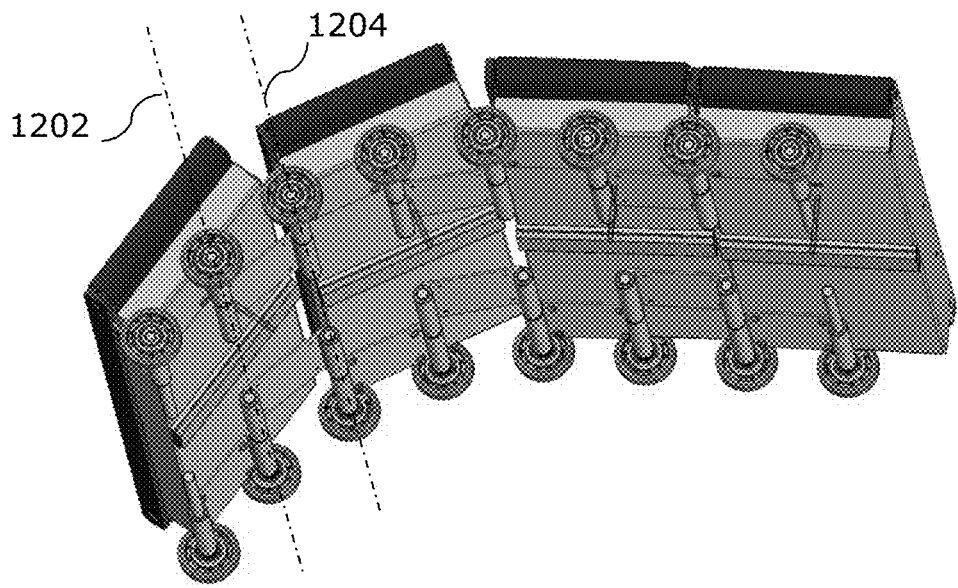

In FIG. 12 a possibly less preferred embodiment is illustrated, where only one of the pivot points is positioned a distance apart from an end of the cart.

The stator 304 is for simplicity not shown in FIG. 4. However, it is shown that each cart comprises four magnets, but each or at least a plurality of the carts may have any number of magnets 306, 406, such as one, two, three, four, five, six, seven, eight, nine, 10, 11, 12 or more magnets in dependence of the chosen configuration. Preferably, each cart comprises a plurality of permanent magnets. As seen in the figures herein, the plurality of permanent magnets are positioned after each other in the moving direction of the carts, links or slats as a row of magnets. The magnets are shown with a constant pitch and alternating polarity. Preferably a single row of magnets is provided as illustrated herein.

The magnets are permanent magnets, and illustrating every second magnet in black and every second magnet in white symbolizes that each magnet has alternating polarity relative to the next. Thus, this illustrates that e.g. the white magnets 406 have a north pole facing towards the transport surface of the cart and a south pole facing the other direction, whereas this is the opposite for the black magnets 306. Thus, the plurality of permanent magnets is arranged with alternating polarity to cooperate with the magnetic field provided by the stator.

It can further be seen that in the shown embodiment the plurality of permanent magnets is arranged with the same pitch or substantially the same pitch between them. It may be seen to be preferred that the permanent magnets have the same dimensions, at least in a moving direction of the carts along the upper or lower track sections.

It can further be seen that the plurality of permanent magnets is arranged so that a magnet configuration and positioning on each cart is identical or substantially identical from cart to cart. The arrow 408 is the view direction of the illustration in FIG. 5. It is illustrated that a gap between adjacent magnets in the rows of permanent magnets is the same or substantially the same as a cart gap 401 between rigid ends of adjacent carts.

Figure 5:
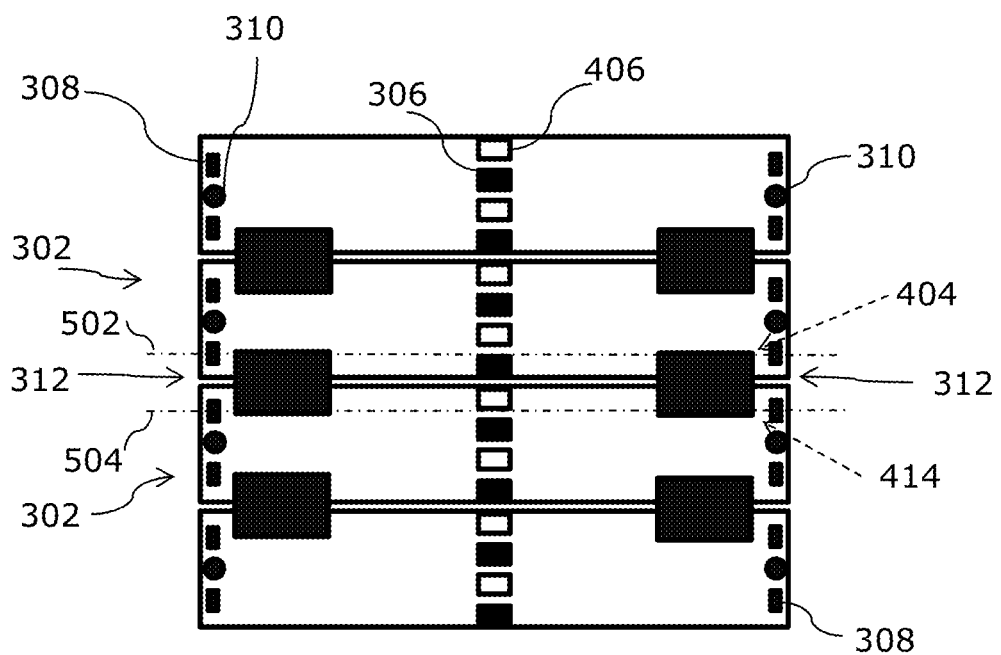
FIG. 5 is a view seen in the direction indicated in FIG. 4.

FIG. 5 is a view seen in the direction 408 indicated in FIG. 4. It is illustrated that two adjacent carts 302 are coupled with two couplings 312, one coupling towards each side of the carts. Alternatively, two adjacent carts may only be coupled by a single coupling. The figure also shows the magnets 306, 406, the carrying wheels 308 and the horizontal guiding wheels 310. One set of guiding wheels are shown on each cart, however possibly only every $2^{nd}$, every $3^{rd}$, $5^{th}$, $10^{th}$, $15^{th}$, $30^{th}$ or every $50^{th}$ cart includes guiding wheels or similar horizontal guiding means.

It can be seen that a pivot axis A 502 is comprised at pivot point P1 404 and a pivot axis A' 504 is comprised at pivot point P2 414.

It is also illustrated that a carrying wheel 308 at the pivot point P1 404 turns about a rolling axis R and a carrying wheel at the pivot point P2 turns about a rolling axis R'. In the illustrated embodiment the pivot axis A 502 is coaxial with rolling axis R and the pivot axis A' 504 is coaxial with rolling axis R'.

The rolling axis of the carrying wheels may be somewhat or slightly offset from the pivot axis, but making the axes coaxial may be seen to simplify the construction and also to make it stronger.

The illustrated carts 302 are all shown with the same or substantially the same length when measured in the moving direction of the carts along the upper or lower track section, but the carts may have different lengths.

Figure 6:
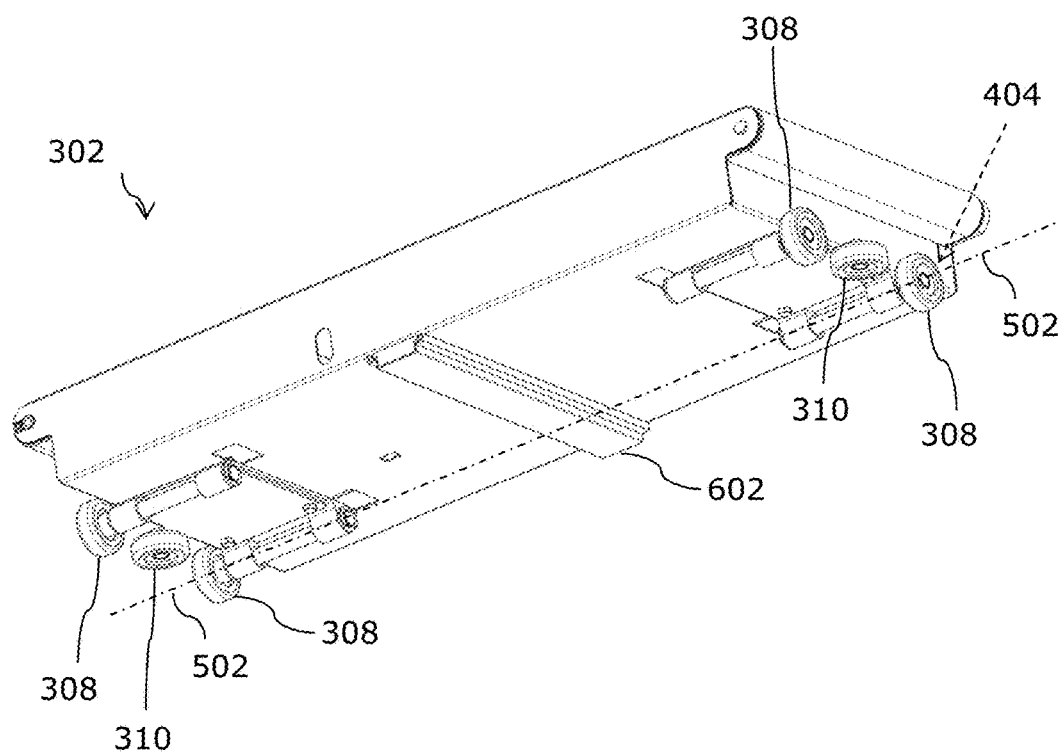
FIG. 6 is a perspective view from below of a cart.

FIG. 6 is a perspective view from below of a cart 302. The magnets are illustrated protected by an encapsulation 602. It can be seen that the pivot axis A' 502 runs transversely to the moving direction of the cart and substantially horizontal when the sorter is in operation.

Figure 7:
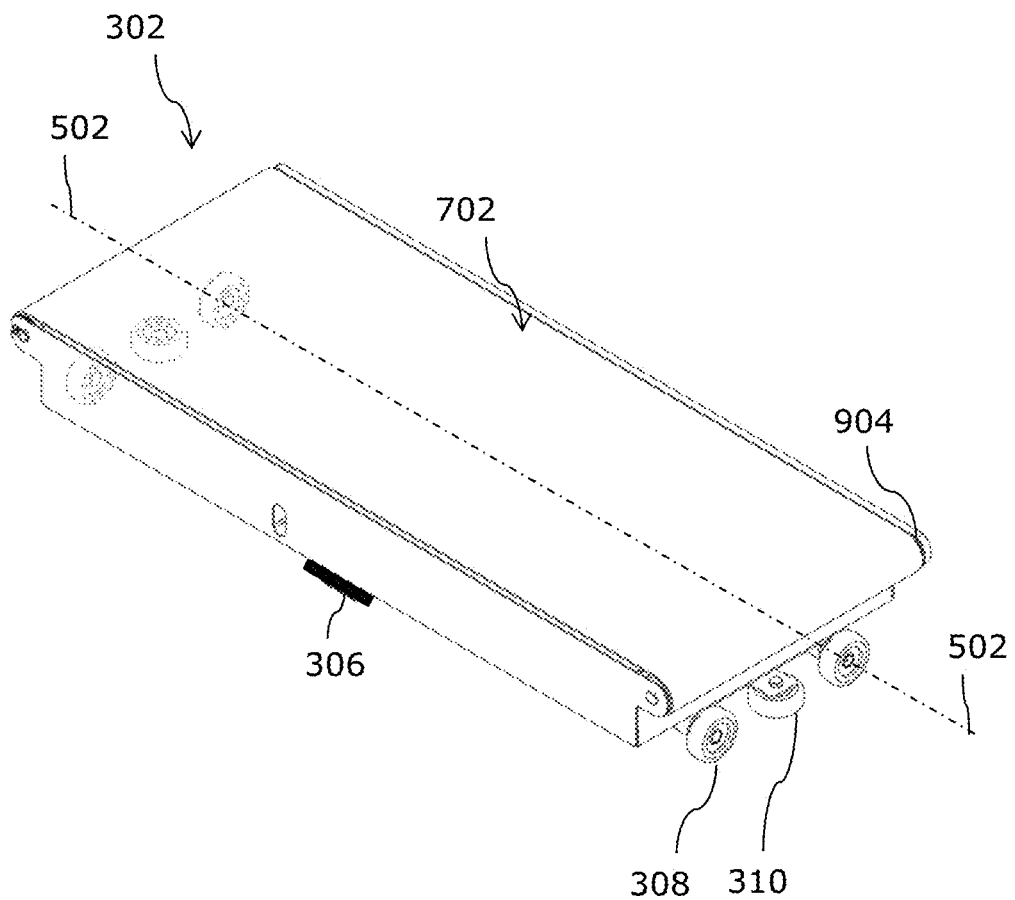
FIG. 7 is a perspective view from above a cart.

FIG. 7 is a perspective view from above a cart 302. It can be seen that the cart comprises an item supporting surface 702. In the illustrated embodiment the item supporting surface is provided as a cross-belt 904.

Figure 8:
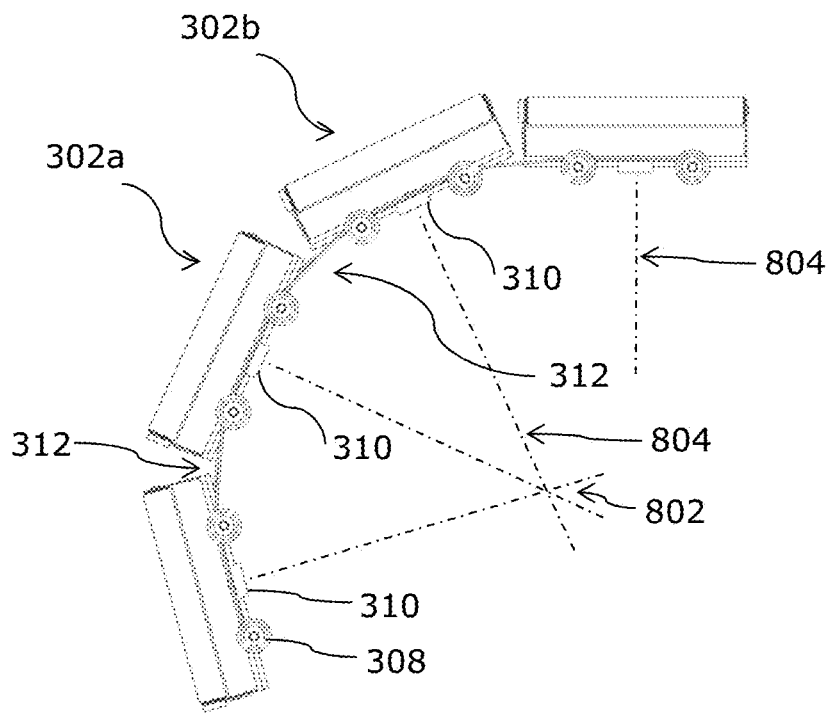
FIG. 8 is a side view of four carts.

FIG. 8 is a side view of four coupled carts, where three of the carts are positioned in an end track section, however, only the carts are shown, not the track. It can be seen that the cart 302a pivots relatively to the adjacent cart 302b at the two ends of the coupling 312. It is illustrated that the horizontally guiding wheels 310 rotate about an axis C 804 which is vertical or substantially vertical along the upper track section and the lower track section when the sorter is in operation. It is illustrated that a line coaxial with the axis C 804 intersects a centre of radius 802 of the end track section, when the sorter is in operation and a cart with the axis C 804 is moved along one of the end track sections.

The horizontally guiding wheels are positioned in a distance 50% or substantially 50% of a distance between the two carrying wheels 308 (or vertically guiding wheels) of a cart when measured in the moving direction of the carts.

Figure 9:
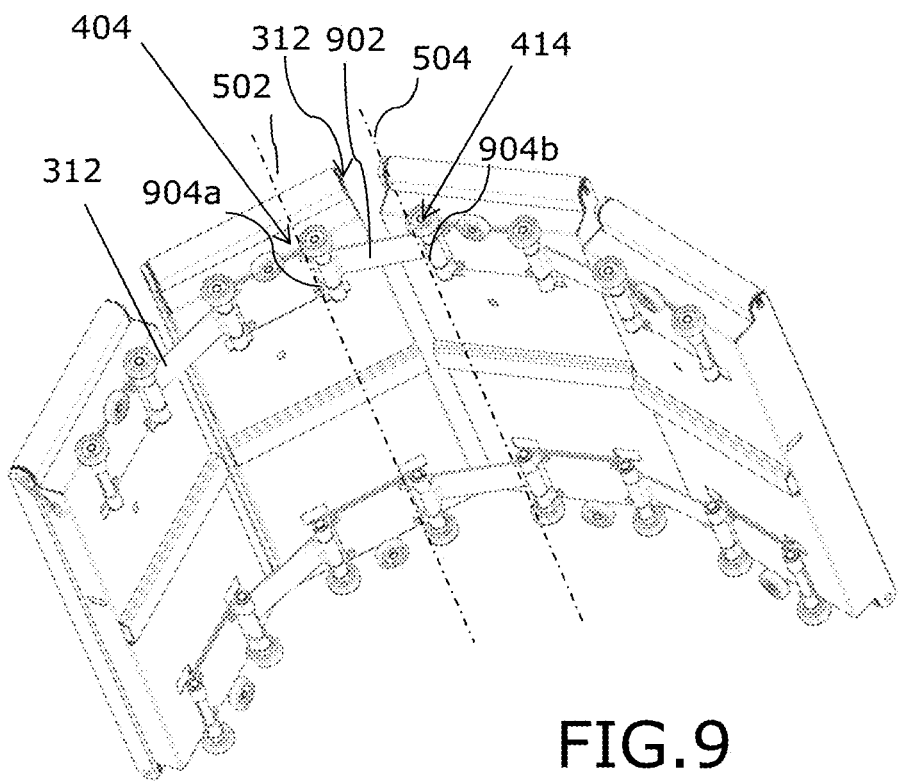
FIG. 9 illustrates that the coupling includes a link.

FIG. 9 is a perspective view showing the below of the carts of FIG. 8, and illustrates that the coupling 312 includes a link 902 to couple the first cart and the second cart 302a and 302b. As illustrated, the link is provided between the first pivot point 404 and the second pivot point 414. At each end of the link, the link is hinged to the carts with hinges 904a and 904b, allowing the adjacent carts to pivot in at least one plane relatively to each other. In the illustrated embodiment the at least one plane is vertical or substantially vertical when the sorter is in operation. Alternatively, the hinge function can be provided so as to enable pivoting the carts relatively to each other in further planes, such as two planes, and such as in all directions by a spherical joint. As seen, the link 902 is half the length of the item supporting surface in the moving direction of the cart or approximately half the length of the item supporting surface in the moving direction of the cart.

Figure 10:
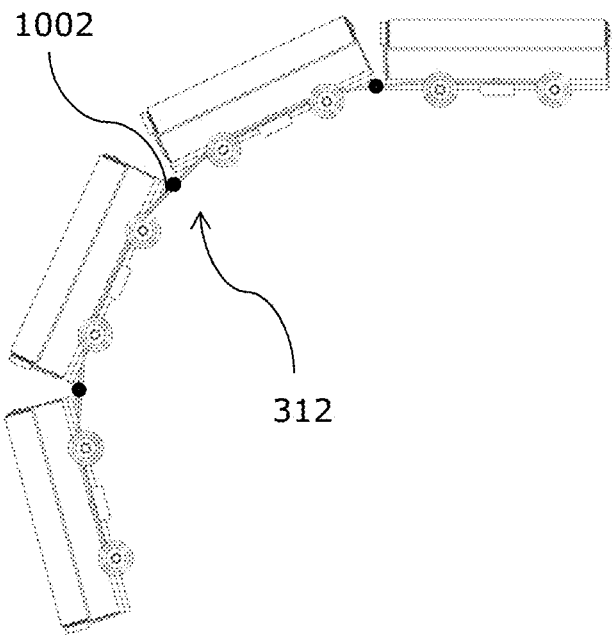
FIG. 10 shows that the link included in the coupling between adjacent carts may comprise a pivot point.

In FIG. 10 it is illustrated that the link included in the coupling 312 between adjacent carts may comprise a pivot point 1002. Hereby, the linkage may enable to take up some variations in length of the coupled carts due to the chord effect, when the sorter is in operation and especially for the carts moving through end sections of the sorter. A carrying wheel may or may not be provided at such pivot point at the links. A horizontal guiding wheel may or may not be provided at or close to such pivot point in the links. However, such horizontally guiding wheels at the links are not shown in the figure.

Figure 11:
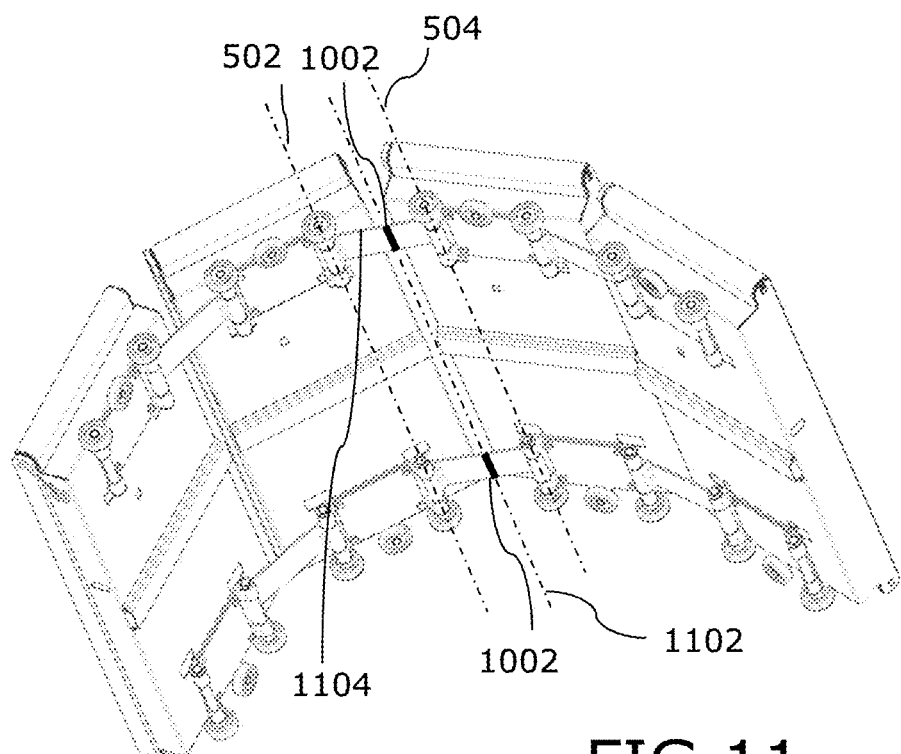
FIG. 11 is a perspective view of the construction illustrated in FIG. 10, FIG. 12 and FIG. 13 illustrate an alternative embodiment.

FIG. 11 is a perspective view of the construction illustrated in FIG. 10. It can be seen, that the pivot point 1002 creates an additional or alternative pivot point, and thus an additional or alternative pivot axis 1102, to the axes 502 and 504, for the carts to pivot relatively to each other.

Figure 13:
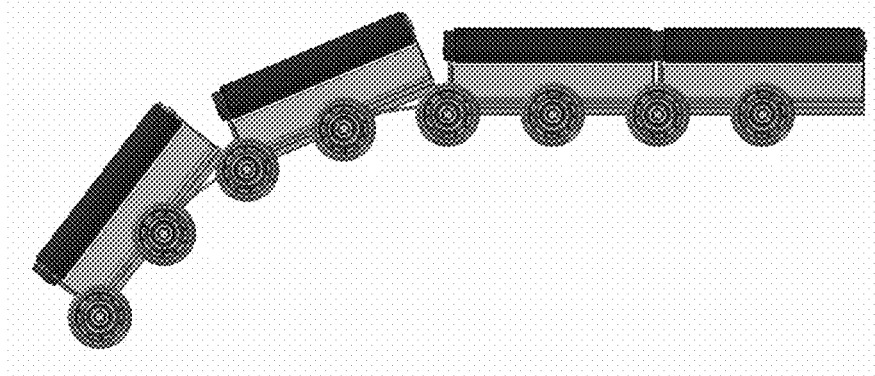

FIG. 12 and FIG. 13 illustrate an embodiment where one first pivot axis 1202 of a coupling between two adjacent carts is positioned substantially in the middle of a cart when seen in the moving direction of the cart, and a second pivot axis 1204 of the coupling between the adjacent carts, is positioned substantially at an end of the adjacent cart or at the end of the adjacent cart.

Figure 14:
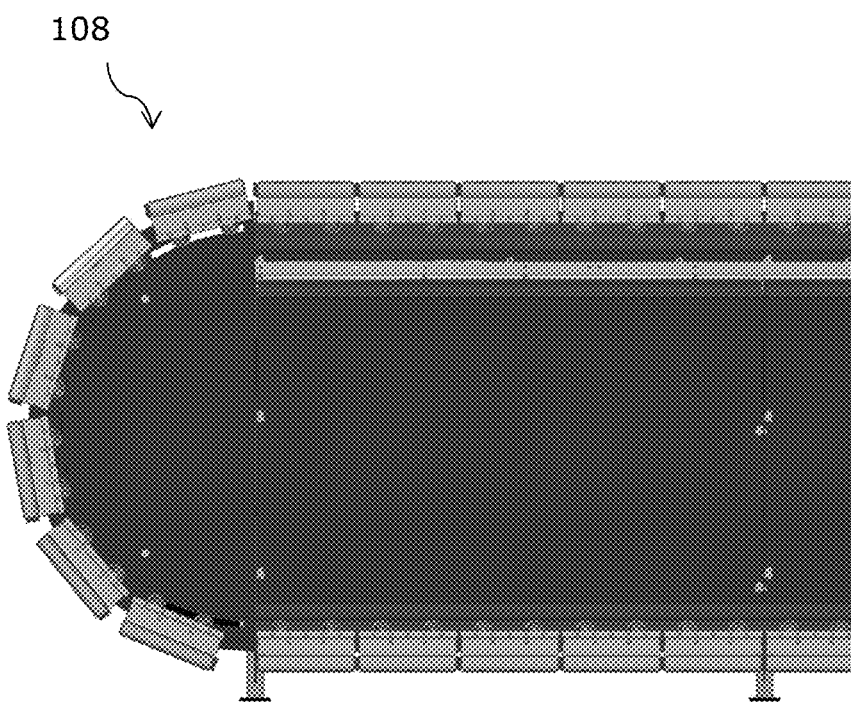
FIG. 14 is a close up side view of one track end of the line sorter.

FIG. 14 is a close up side view of one track end 108 of the line sorter 102 shown in FIG. 1.

In short, it is herein disclosed that, e.g., in order to provide a line sorter in which acoustic noise resulting from the polygon effect is reduced, there is provided a sorter 102 for sorting items of various shapes, sizes and weights, such as postal parcels or airport baggage. The sorter includes a closed loop comprising a plurality of sorting carts 302 for moving along an upper track section, a lower track section and end track sections in a moving direction. The plurality of carts are coupled at couplings 312, which enable the carts to pivot relatively to each other in at least one plane when in operation. Each cart is able to pivot relatively to an adjacent cart at two or more pivot points 404, 414, 1002 where the two or more pivot points are positioned a pivot point distance greater than zero apart in the moving direction of the carts.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A sorter for sorting items of various shapes, sizes and weights, such as postal parcels or airport baggage, the sorter comprising
   an upper track section and a lower track section, where the upper track section and the lower track section are connected at end track sections, one end track section at each of two ends of the sorter,
   at least one position dedicated induction of items onto the sorter, such as by an induction,
   a plurality of discharges for sorting one or more items into their respective discharge,
   a closed loop comprising a plurality of sorting carts being provided for moving along the upper track section, the lower track section and the end track sections in a moving direction,
   the plurality of sorting carts each comprising at least one item supporting surface,
where the plurality of carts are coupled at couplings, which couplings enable the carts to pivot relatively to each other in at least one plane when in operation,
where each cart is able to pivot relatively to an adjacent cart at two or more pivot points,
where the two or more pivot points are positioned a pivot point distance greater than zero apart in the moving direction of the carts,
wherein each of the plurality of carts comprises one or more carrying wheels or similar rolling means for carrying the cart and the item supporting surface,
wherein the one or more carrying wheels are provided at the pivot points, at least one carrying wheel or one set of carrying wheels at each pivot point, and
wherein a pivot axis A is comprised at the first pivot point and a pivot axis A' is comprised at the second pivot point, and where a carrying wheel at the first pivot point turns about a rolling axis R and a carrying wheel at the second pivot point turns about a rolling axis R'.

2. The sorter according to claim 1, wherein a first cart of the plurality of carts is adjacent to a second cart of the plurality of carts when in operation, and where the first cart comprises a first pivot point and the second cart comprises a second pivot point.

3. The sorter according to claim 2, wherein a link is included to couple the first cart and the second cart, and where the link is provided between the first pivot point and the second pivot point.

4. The sorter according to claim 3, wherein the link at least partly overlaps a length of a horizontal projection of at least one of the item supporting surfaces of the first and second carts in the moving direction of the carts.

5. The sorter according to claim 1, wherein the pivot point distance is shorter than a length of the at least one item supporting surface in the moving direction of the carts.

6. The sorter according to claim 1, wherein the pivot axis A is coaxial with rolling axis R and/or the pivot axis A' is coaxial with rolling axis R'.

7. The sorter according to claim 1, further comprising horizontally guiding means for horizontally guiding the carts along the track when in operation.

8. The sorter according to claim 7, wherein the horizontally guiding means are guiding wheels that rotate about an axis C which is vertical or substantially vertical along the upper track section and the lower track section when the sorter is in operation.

9. The sorter according to claim 8, wherein a line coaxial with the axis C intersects a centre of radius of at least a segment of an end track section, when the sorter is in operation and a cart with the axis C is moved along one of the end track sections.

10. The sorter according to claim 1, wherein the plurality of sorting carts are moved along the upper track section, the lower track section and the end track sections in the moving direction when in operation by a linear synchronous motor propulsion system.

11. The sorter according to claim 10, wherein a first continuous row of permanent magnets is formed by the magnets of a row of carts along the upper track section and a second continuous row of permanent magnets is formed by the magnets of a row of carts along the lower track section, and where the plurality of permanent magnets on the carts follow or substantially follow a curve form at the end track sections, and where
   a gap between adjacent magnets in the first and second continuous rows of magnets is the same or substantially the same between each of the magnets.

12. The sorter according to claim 11, wherein the gap is also the same or substantially the same between adjacent magnets of adjacent carts.

13. The sorter according to claim 12, wherein each of the plurality of carts comprises a plurality of permanent magnets positioned below the complete length of a projection of the item supporting surface in the moving direction of the carts or positioned substantially along the complete length of the projection of the item supporting surface.

14. The line sorter according to claim 1, where the at least one position dedicated induction of items onto the line sorter, is at the lower track section and/or the upper track section.

15. The line sorter according to claim 1, where the at least one position dedicated induction of items onto the line sorter, is provided at an end track section.

16. The line sorter according to claim 1, where the plurality of discharges are provided along the lower track section and/or the upper track section.

* * * * *